United States Patent [19]

Heikel

[11] Patent Number: 4,863,711

[45] Date of Patent: * Sep. 5, 1989

[54] PROCESS FOR PREPARING NODULAR PIGMENTARY TITANIUM DIOXIDE

[75] Inventor: Henrik R. Heikel, Leland, Mich.

[73] Assignee: The Dow Chemical Company, Midland, Mich.

[*] Notice: The portion of the term of this patent subsequent to Jul. 26, 2005 has been disclaimed.

[21] Appl. No.: 102,174

[22] Filed: Sep. 29, 1987

Related U.S. Application Data

[63] Continuation-in-part of Ser. No. 821,507, Jan. 21, 1986, Pat. No. 4,759,916, which is a continuation of Ser. No. 484,106, Apr. 11, 1983, abandoned.

[51] Int. Cl.[4] .................. C01G 23/047; C22B 3/00
[52] U.S. Cl. .................................. 423/610; 423/84; 423/82; 75/101 R; 75/114; 75/121
[58] Field of Search ............... 423/610, 84, 71, 82; 75/101 R, 114, 121

[56] References Cited

U.S. PATENT DOCUMENTS

| | | | |
|---|---|---|---|
| 1,106,406 | 8/1914 | Rossi et al. | 423/81 |
| 1,166,547 | 1/1916 | Rossi et al. | 423/71 |
| 1,911,396 | 5/1933 | Saklatwalla et al. | 423/71 |
| 1,932,087 | 10/1933 | Richter | 423/71 |
| 2,182,420 | 12/1939 | Allan et al. | 423/84 |
| 2,333,661 | 11/1943 | McCord | 423/82 |
| 2,531,926 | 11/1950 | Todd et al. | 423/84 |
| 2,941,863 | 6/1960 | Wainer | 423/71 |
| 3,067,010 | 12/1962 | Long et al. | 423/70 |
| 3,112,178 | 11/1963 | Judd | 423/80 |
| 3,329,484 | 7/1967 | Long et al. | 423/611 |
| 3,342,424 | 9/1967 | Whately et al. | 241/21 |
| 3,526,477 | 9/1970 | Shen Wu Wan | 423/69 |
| 3,549,322 | 12/1970 | Klein | 423/85 |
| 3,647,414 | 3/1972 | Nilsen | 423/83 |
| 3,825,419 | 7/1974 | Chen | 423/86 |
| 3,862,297 | 1/1975 | Claridge et al. | 423/615 |
| 3,903,239 | 9/1975 | Berkovich | 423/82 |
| 4,019,898 | 4/1977 | Chen | 423/82 |
| 4,038,363 | 7/1977 | Jarish | 423/82 |
| 4,247,523 | 1/1981 | Hall et al. | 423/82 |
| 4,288,417 | 9/1981 | Rahm et al. | 423/83 |

FOREIGN PATENT DOCUMENTS

| | | | |
|---|---|---|---|
| 53-280099 | 3/1978 | Japan | 423/610 |
| 58-88121 | 5/1983 | Japan | 423/610 |
| 61-21915 | 1/1986 | Japan | 423/82 |
| 714857 | 9/1954 | United Kingdom . | |

OTHER PUBLICATIONS

Babor et al., General College Chemistry, p. 66, 1940, (Thomas Y. Crowell).
Lauer et al., Chemical Engineering Techniques, pp. 301–304, 1952 (Reinhold Publishing Corp.).
Weast et al., Handbook of Chemistry and Physics, 62nd ed., pp. D-12, 1981 (CRC Press, Inc.).
Perry et al., Chemical Engineers' Handbook 5th Ed., pp. 3–64, 21–41, 1973 (McGraw Hill Book Co.).
Bailor et al., Chemistry, pp. 419–420 (Academic Press).
Smithells, Metals Reference Book, vol. II, p. 964, 1955 (Butterworths Scientific Publications).
Kirk-Othemer Encyclopedia of Chemical Technology, vol. 15, pp. 495–499 (1968), vol. 20, pp. 351–352, 392–406 (1964).
Guequin et al., "Upgrading of Titanium Slag by Soda & Roasting and Sulphuric Acid Leaching," The Metallurgical Society of CIM, 1978, pp. 114–116.
Raddatz et al., "Titania From Intermediates Prepared by Soda-Smelting Ilmenite", Bureau of Mines. Report of Investigations, No. 8347, 1979, pp. 1–10.
Kerr-McGee Chemical Corporation, "Mobile Facility Synthetic Rutile Plant Dedication", Feb. 11, 1977, pp. 7–8.

Primary Examiner—Robert L. Stoll
Assistant Examiner—Adriana L. Eng

[57] ABSTRACT

A process for preparing nodular pigmentary titanium dioxide by grinding and mixing a titanium-bearing material, such as sorelslag, with an alkali metal compound such as sodium hydroxide, and roasting the mixture. The roasted material is ground followed by washing and filtering. Thereafter, the solid residue is digested with hydrochloric acid for a time and temperature sufficient to form nodular-shaped solids. After removing the acid by filtration and washing the solid residue, the residue is calcined to provide a nodular titanium dioxide pigment.

37 Claims, 1 Drawing Sheet

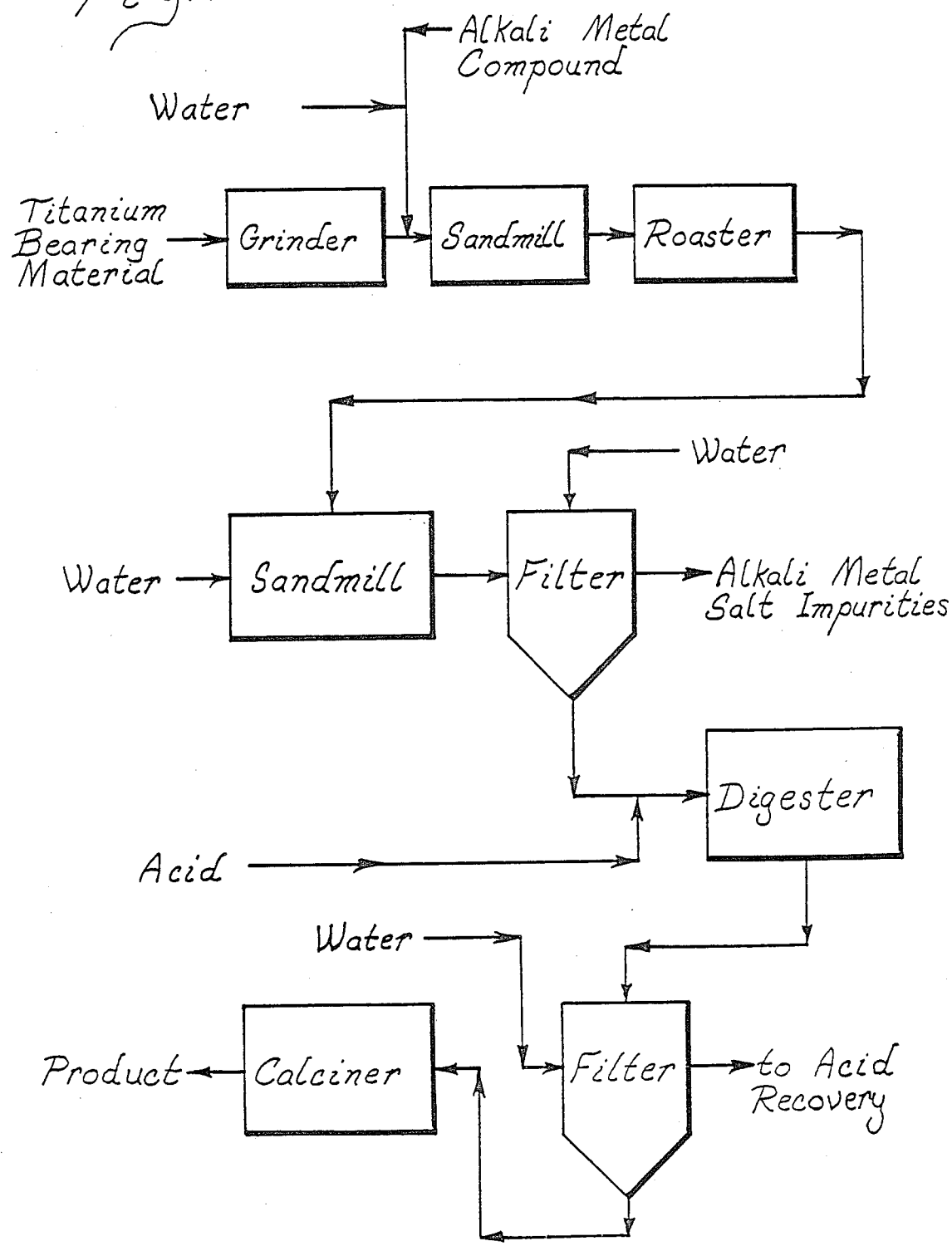

PROCESS FOR PREPARING NODULAR PIGMENTARY TITANIUM DIOXIDE

CROSS-REFERENCE TO RELATED APPLICATION

This is a continuation-in-part of application Ser. No. 821,507, filed Jan. 21, 1986, which was a continuation of application Ser. No. 484,106, filed Apr. 11, 1983 (now abandoned).

BACKGROUND OF THE INVENTION

This invention relates to the preparation of titanium dioxide, and more particularly, to a process for preparing nodular pigmentary titanium dioxide from titanium dioxide-bearing materials.

Titanium dioxide ($TiO_2$) is a well known opacifying pigment useful in paint and coating compositions, in plastic materials and as a filler in paper and other materials. Various known processes for producing $TiO_2$ include, for example, conventional processes commonly referred to as the "sulphate" process and the "chloride" process.

The "sulphate" process involves solubilizing the titanium values in low grade titanium ores, such as ilmenite or sorelslag, with concentrated sulfuric acid and meticulously removing ferrous sulfate formed in the process. This is followed by precipitation, washing and calcining to form pigmentary $TiO_2$.

The "chloride" process involves volatilizing, as tetrahalide, the titanium values in high grade titanium ores, such as Australian rutile (containing about 95 percent $TiO_2$) or highly beneficiated ilmenite. This is followed by purification and oxidation.

The sulphate and chloride processes are very complex and capital intensive which accounts for the relatively costly product of $TiO_2$ pigment made by such processes. It is, therefore, desired to provide a simplified process, and relatively less expensive process for preparing a $TiO_2$ pigment whereby the titanium values in titanium dioxide-bearing materials or ores are not solubilized or converted to a vaporizable liquid compound, but are separated, through solid-liquid reactions, from the ore's impurities and mechanically comminuted to pigmentary size.

It is further desired to provide a $TiO_2$ pigment which is nodular in shape.

SUMMARY OF THE INVENTION

The present invention is directed to a process for preparing nodular-shaped titanium dioxide pigment by mixing a titanium dioxide-bearing material with an alkali metal compound; roasting the mixture; digesting the roasted material in hydrochloric acid, said digestion including heating the roasted material/acid solution at a rate sufficient to form nodular-shaped solids and refluxing the roasting material/acid solution; and calcining the digested material.

BRIEF DESCRIPTION OF DRAWING

FIG. 1 is a schematic flow diagram of one manner in which the process of the present invention can be carried out.

DETAILED DESCRIPTION OF THE INVENTION

The starting material for the process of the present invention is a titanium-bearing material, for example, sorelslag. Various grades of sorelslag may be used in the present process. For example, the composition of one typical grade of sorelslag, expressed as oxides, may consist of approximately 70 weight percent (wt. %) $TiO_2$ and approximately 11 wt. % FeO as an impurity with the remainder being impurities including, for example, CaO, MgO, $SiO_2$, $Al_2O$, MnO, $V_2O_5$, $Cr_2O_3$ and other oxides as trace impurities. Another grade of sorelslag useful in the present process may consist of approximately 78 wt. % $TiO_2$, approximately 8 wt. % FeO as an impurity, and the remainder impurities such as those listed above.

It is to be understood that the present invention is not limited to sorelslag. Other titanium-bearing materials or ores as starting materials for the present invention are within the scope thereof. For example, another titanium-bearing slag referred to as "chloride slag" may be used in the process of the present invention. A typical chloride slag may consist of approximately 85 wt. % $TiO_2$, approximately 10 wt. % FeO as an impurity and the remainder impurities such as those listed above.

Another suitable raw material for the process of the present invention can be an intermediate product formed during a beneficiation process of ilmenite such as that described in U.S. Pat. No. 3,825,419. A typical raw material formed during the beneficiation process above may consist of approximately 95 wt. % $TiO_2$, approximately 1 wt. % FeO as an impurity and the remainder impurities such as those listed above.

Examples of other titanium-bearing materials which can be used in the process according to the present invention are any titanium-bearing material which is so treated that the titanium dioxide portion thereof becomes reactive with an alkali metal compound when heated at about 700° C. to about 950° C. An alkali metal compound, as used herein includes, for example, an alkali metal hydroxide, an alkali metal carbonate, or an alkali metal oxide or mixtures thereof.

All of the equipment used in the process of the present invention for grinding, mixing, roasting, filtering and calcining and all other operations are carried out by conventional equipment suitable for the purpose of continuous or batch type operation. For comminuting the titanium-bearing starting material to micron size it is preferred to use "sandmills" of the type described and illustrated, for example, in U.S. Pat. No. 2,581,414. A "sandmilling" process will refer herein to a process of grinding a material to micron particle size using the type of equipment described and illustrated, for example, in U.S. Pat. No. 2,581,414. However, the grinding media used in such equipment is not limited to sand, but can be glass, steel, ceramic, or any other suitable grinding media having or spherical or bead shape, generally, in the range of about 0.5 to about 3 millimeters in diameter.

The digesting step has to be carried out in vessels with inner surface portions or linings resistant, under normal operating conditions, to the acid utilized in the process. Suitable materials for such resistant surface portions are, for example, glass, FRP (glassfiber reinforced plastic), polyester, vinylester, epoxy, other suitable plastics, Hasteloy (Ni/Mo alloy), rubber, refractory metals (Ta, Zr, Cb) or acid resistant brick.

According to a preferred embodiment of the present invention, the size of the titanium-bearing material should be small enough for all or substantially all of the material to react with an alkali metal compound. With reference to FIG. 1, the titanium-bearing starting material is first ground, for example, by hammermilling to a size suitable for sandmilling. Hereinafter, the process of the present invention will be described with reference to sorelslag as the titanium-bearing material but, as aforementioned, the material is not limited to sorelslag.

After the hammermilling step, the sorelslag is preferably sandmilled to an average particle size of 15 micron or less. More preferably, the sorelslag is sandmilled to an average particle size of about 10 micron or smaller. Even more preferably, the starting material may be sandmilled to a top size of 10 micron, i.e., to a maximum particle size of 10 micron or less. Particles larger than about 10 micron may occlude impurities which may not be readily removed from the starting material in the subsequent process steps of the present invention.

After the sorelslag is ground to the preferred particle size, the sorelslag is then intimately mixed with an alkali metal compound for example, selected from the group consisting of an alkali metal hydroxide, an alkali metal carbonate, an alkali metal oxide or mixtures thereof. Alkali metals such as sodium, potassium, lithium, rubidium, or cesium or mixtures thereof may be used. The preferred compound is an alkali metal hydroxide, and more preferably sodium hydroxide, because it is readily reactive with the finely ground sorelslag material. Hereinafter, the process of the present invention will be described with reference to sodium hydroxide as the alkali metal compound but it is understood that the present invention is not limited thereto.

Sodium hydroxide may be mixed with the sorelslag material prior to roasting and preferably during the sandmilling step above or, alternatively, prior to the sandmilling step. The mixture of sorelslag and sodium hydroxide can contain about 30 parts by weight or above of sodium hydroxide to about 100 parts by weight of sorelslag. Preferably, about 30 to about 60 parts by weight of sodium hydroxide to about 100 parts by weight of sorelslag is used. More preferably, the ratio by weight of sorelslag to sodium hydroxide is about 100:35 to about 100:45. Using a ratio of sorelslag to sodium hydroxide above or below the range of about 100:30 to about 100:60 is operable, however, it may result in an unsatisfactory $TiO_2$ pigmentary product. When a material bearing a higher $TiO_2$ content is used, the hydroxide portion of the mixture is increased accordingly.

After the sandmilling step, the mixture of sorelslag and sodium hydroxide is heated or roasted at temperatures ranging from about 700° C. to about 950° C. for a length of time ranging from about 1 to about 3 hours. At roasting temperatures above about 950° C. a hard material or clinker may result, and below about 700° C. the reaction between the sodium hydroxide and sorelslag may not be complete. It is, therefore, preferred to roast the mixture at about 800° C. to about 870° C. for about 1½ to about 2 hours. Preferably, the roasted mixture is subsequently ground to about 0.5 to about 2 microns, because, as mentioned above, fine particles will enhance the removal of impurities from the $TiO_2$ product during subsequent treatment of the roasted material.

During the roasting step, it is believed that the $TiO_2$ contained in the mixture reacts with the sodium hydroxide forming a sodium titanate. Some of the impurities in the material may also react with the particular hydroxide used to form an alkali metal salt, leaving them in an extractable form. For example, when sodium hydroxide is used, the impurities in their alkali metal salt form include sodium vanadate, sodium chromate, sodium aluminate and sodium silicate, which are readily soluble in water. These impurities are therefore preferably at least partially dissolved in water by washing, after the roasting step, to reduce, or more preferably, substantially entirely remove deleterious amounts of the impurity from the $TiO_2$ product. Other compounds present in the starting material such as iron oxide, magnesium oxide, and calcium oxide are soluble in mineral acids, such as hydrochloric acid (HCl), and are removed from the $TiO_2$ product during the digestion step as discussed below.

After the water soluble impurities are washed off or dissolved from the roasted material, the remaining insoluble alkali metal titanate and residue is digested in hydrochloric acid. To obtain the nodular form of $TiO_2$ pigment product, the digestion step of the overall process of the present invention is critical. The normality of the acid used is about 6 normal (N) HCl acid. The normality of the acid/roasted material mixture must be maintained at about 6N during the digestion step. The digestion step must be carried out for a time and temperature sufficient to form nodular-shaped particles during the digestion.

In a preferred embodiment of the present invention, the roasted material is mixed with HCl at room temperature (i.e. from about 20° C. to about 30° C.). The roasted material/acid mixture or solution is then heated, slowly, up to the boiling point of the acid at a rate of about 5° C./minute or less, preferably from about 2° C./min to about 3° C./min, and more preferably from about 2° C./min or less. It is believed that the nodular sodium titanate material is formed during the digestion step.

After reaching the boiling point of the acid (which variees according to pressure) the solution is preferably refluxed; for example, at about 90° C. to about 111° C., and preferably at about 108° C., for a length of time to substantially complete the digestion step. The digestion of the solution is substantially complete in about 10–15 minutes. Digestion times of up to about 120 minutes can be used but preferably the digestion time is from about 10 to about 40 minutes. The digestion step above may be carried out one or more times, however, it is preferred to carry out the digestion step at least two times. Higher heating rates and time may be used, however, pressurized equipment may be necessary.

During the digestion step, the alkali metal titanate formed is believed to hydrolyze into amorphous hydrous $TiO_2.nH_2O$ and the iron oxides solubilize as ferrous and ferric chloride. The iron chlorides and other impurities in the acid suspension are removed by, for example, centrifugation or filtration and, optionally, disposed of or further treated to recover unreacted acid. The insoluble amorphous titanium dioxide residue is washed with a fluid such as water to further remove soluble impurities. Thereafter, the $TiO_2$ is recovered from the water by, for example, filtering or centrifuging. A white residual cake results after this step is carried out.

The iron impurities in the $TiO_2$ pigment are believed to be the cause of a non-white pigment. Preferably the $TiO_2$ pigment contains less than 520 ppm Fe and more preferably less than 200 ppm.

The amorphous $TiO_2$ is calcined, preferably, for about 30 to about 60 minutes at temperatures ranging from about 800° C. to about 1000° C. to convert the $TiO_2$ to its crystalline rutile form. More preferably, a temperature of about 875° C. to about 925° C. for about 30 minutes to about one hour is employed, because undesirable discoloration of the resulting pigment is minimized and lower temperatures are not as effective in converting the product into its desirable crystalline form.

The crystalline rutile product obtained by the process of the present invention is preferably nodular in shape. Preferably the nodular-shaped $TiO_2$ particle has a particle size of less than about 1 micron and preferably about 0.3 micron, because the light scattering ability of the pigment and, consequently, its value as an opacifier is dictated by a narrow optimum size range. If the crystalline rutile product obtained after calcination is severely agglomerated it may be pulverized or sandmilled to the preferred particle sizes above.

The $TiO_2$ product can be used as a pigment in any of the typical applications for which opacifying pigments are used. As an illustration only and not to limit the scope of the the present invention, the $TiO_2$ pigment obtained from the process of the present invention can be used as an opacifier in paint, paper or plastics. The opacifying power and brightness of the product is determined by measuring its light scattering coefficient and reflectance. Pigment obtained by the process of this invention desirably has a light scattering coefficient of above about 2000 $cm^2/g$ and preferably above about 4000 $cm^2/g$ and a brightness of above about 80 percent and preferably above about 85 percent.

The example which follows illustrates the present invention but the present invention is not to be limited thereby.

EXAMPLE 1

A sorelslag sample with a particle size of about 200 mesh was obtained from QIT-FER ET TITANE, INC., a Canadian company. A 1200 gram (g) sample of the 200 mesh sorelslag and 480 g of sodium hydroxide (NAOH) were placed in a laboratory sandmill containing one (1) liter (1) of 1.2 millimeters (mm) in diameter steel shot and about 1,000 milliliters (ml) of water. Then, the mixture was sandmilled until the maximum particle size (top size) of the sorelslag was 10 microns. The slag/NaOH ratio of the mixture was 100/40 by weight. After the steel shot was screened out, the mixture was dried in an oven at 100° C. overnight. The dried material was hammermilled to break up the agglomerates formed after drying.

The hammermilled material was then roasted at 875° C. for two hours. The roasted material was run through a grinder to break up the agglomerates formed after roasting and then the roasted material was sandmilled for five minutes in about 700 ml of water and one liter or 1.2 mm in diameter zirconium oxide beads. After the beads were screened out, the suspension was vacuum filtered and the filter cake was washed with water two times, each wash using about one liter of water.

A 194 gram sample of the roasted material on a dry basis was digested in 1,000 ml of 6 N hydrochloric acid (HCl). The digestion step was carried out as follows: The temperature of the 6 N solution (i.e. roasted material/acid mixture) was at room temperature (20° C.). Then the temperature was increased slowly at a rate of bout 5° C./minute up to the boiling point of the 6 N acid solution and the solution was allowed to reflux for 15 minutes. The amount of water in the wet filter cake was taken into account when the normality of the HCl acid was calculated. A flocculant, 3 g of a 1% solution of Sepran M6-205 (a trademark of The Dow Chemical Company) was added to the digestion suspension. The suspension was filtered and washed two times with water, each wash using about one liter of water. The filter cake was redispersed in water and digested a second time with 800 ml of 6 N HCl in the same manner as the first digestion. The same amount of flocculant as in the first digestion was added to the suspension. The suspension was then vacuum filtered and washed as in the first digestion. A filter cake was dried at 110° C. for about three hours. The dried material was then calcined for one hour at 900° C.

The dry brightness of the calcined material was measured by packing a portion of the material into a sample vial cap which was about ½ inch deep by 1 inch in diameter and measuring the reflectance of the sample using a Photovolt equipped with a blue filter. The instrument was first calibrated by using a white standard chip of known brightness of 86.9 with the blue filter. The dry brightness of the calcined material of this example was 88.0%.

The scattering coefficient of the calcined material was measured by the following procedure:

A 15 gram sample of pigment and ½ gram of sodium tripolyphosphate in 70 grams of water was dispersed in a high speed disperser for 5 minutes. Then 3.1 g of a latex sold under the tradename Rhoplex B-100 by Rohm and Haas Co. and ½ g of a surfactant sold under the tradename Triton X-100 by Rohm and Haas Co. was added to the dispersion and stirred gently by hand for about 3 minutes. A drawdown coating of the dispersion was applied on a 2 mil clear plastic sheet of Mylar (a trademark of E. I. DuPont de Nemours & Co.) with a 1.5 mil Bird film applicator and placed in an oven and dried at 100° C. for 3 minutes. A 2 inch by 2 inch square sample of the coated 178 sheet was weighed and then placed on a 2 inch by 5 inch optically flat black glass plate which was coated with propylene glycol. The propylene glycol was used to ensure optical contact. Using a Photovolt the reflectance over the black glass, $R_B$, was measured for the sample. The coating on the 2 by 2 inch Mylar sheet was washed off and the Mylar sheet was dried and then weighed to find the coating weight per unit area, W. A practical approximation to an infinitely opaque coating, $R_\infty$, was obtained as follows: A drawdown coating was applied on a sheet of 2 mil Mylar and dried and this step was repeated until a maximum reflectance was reached as measured by the Photovolt. Using the $R_B$, $R_\infty$, and W values, a scattering power value, SW, was found by using the Tables in the article Mitton-Jacobsen, "New Graphs for Computing Scattering Coefficient and Hiding Power", Official Digest, September 1963, pages 871–913. The scattering coefficient, S, was then calculated using the formula:

In this example the scattering coefficient of the calcined material was 3,336 $cm^2/g$.

The iron content of the calcined material was measured using ionic coupled plasma spectrometry. In this example the iron content of the calcined material was 200 ppm.

What is claimed is:

1. A process for preparing nodular titanium dioxide pigment comprising digesting in hydrochloric acid a mixture of a titanium dioxide-bearing material and an alkali metal compound, said digestion including heating the mixture at a rate and temperature sufficient to form a nodular-shaped material and refluxing said mixture; and calcining the digested material.

2. The process of claim 1 wherein the titanium dioxide-bearing material is selected from the group consisting of sorelslag, beneficiated ilmenite and chloride slag.

3. The process of claim 1 wherein the titanium dioxide-bearing material is a sorelslag.

4. The process of claim 1 wherein the alkali metal compound is selected from a group consisting of an alkali metal hydroxide, an alkali metal carbonate or an alkali metal oxide.

5. The process of claim 1 wherein the alkali metal hydroxide is sodium hydroxide.

6. The process of claim 1 wherein the mixture is heated up to its boiling point temperature.

7. The process of claim 1 wherein the mixture is heated up to its boiling point temperature at a rate of from about 2° C./minute to about 5° C./minute.

8. A process for preparing nodular titanium dioxide pigment comprising the steps of:
   (a) mixing a titanium dioxide-bearing material with an alkali metal compound said titanium-bearing material characterized in that it is at a size sufficient for substantially all of the material to react with the alkali metal compound;
   (b) roasting the mixture;
   (c) mixing a hydrochloric acid to the roasted mixture;
   (d) heating the roasted material/acid mixture to its boiling point at a rate sufficient to form a nodular-shaped material; and
   (e) refluxing the material of step (d); and
   (f) calcining the material of step (e).

9. The process of claim 8 wherein the alkali metal compound is selected from the group consisting of an alkali metal hydroxide, an alkali metal carbonate or an alkali metal oxide.

10. A process for preparing nodular titanium dioxide pigment comprising the steps of:
    (a) comminuting a titanium dioxide-bearing material to a size sufficient for substantially all the material to react with an alkali metal compound selected from the group consisting of an alkali metal hydroxide, an alkali metal carbonate, and an alkali metal oxide;
    (b) mixing the titanium dioxide-bearing material with an alkali metal compound selected from the group consisting of an alkali metal hydroxide, an alkali metal carbonate, and an alkali metal oxide;
    (c) roasting the mixture;
    (d) mixing the roasted mixture with hydrochloric acid;
    (e) heating the mixture of (d) to its boiling point at a rate sufficient to form a nodular-shaped solid product in the acid;
    (f) refluxing the material of step (e); and
    (g) calcining at least the solid product to form a nodular-shaped titanium dioxide pigment.

11. The process of claim 10 including further the step of micronizing the calcined product.

12. The process of claim 11 including further the step of micronizing the calcined product to below about one micron.

13. The process of claim 10 wherein the acid digestion step (e) and (f) are carried out at least two times.

14. A process for preparing a nodular pigmentary titanium dioxide comprising the steps of:
    (a) sandmilling a mixture of a titanium dioxide-bearing material and an alkali metal hydroxide;
    (b) roasting the mixture;
    (c) sandmilling the roasted mixture;
    (d) separating solubilized material from the roasted mixture;
    (e) mixing the roasted mixture with hydrochloric acid;
    (f) heating the roasted material/acid mixture to its boiling point at a rate sufficient to form a nodular-shaped solid product in the acid;
    (g) refluxing the material of step (f);
    (h) separating the solid product from the acid;
    (i) washing the solid product; and
    (j) calcining the solid product to form a nodular-shaped titanium dioxide pigment.

15. The process of claim 14 wherein the titanium dioxide-bearing material is selected from the group consisting of sorelslag, beneficiated ilmenite or chloride slag.

16. The process of claim 14 wherein the titanium dioxide-bearing material is sorelslag.

17. The process of claim 14 wherein the alkali metal hydroxide is sodium hydroxide.

18. The process of claim 14 wherein the acid is mixed with the roasted material at room temperature.

19. The process of claim 14 including further the step of micronizing the calcined product.

20. The process of claim 14 including further the step of micronizing the calcined product to below about 1 micron.

21. The process of claim 14 wherein the digestion step is carried out at least two times.

22. The process of claim 14 wherein the titanium dioxide-bearing material is sandmilled to an average particle size of about 10 microns or less.

23. The process of claim 14 wherein step (a), the titanium dioxide-bearing material is mixed with the alkali metal hydroxide in a ratio of about 100:30 to about 100:60.

24. The process of claim 14 wherein the mixture is roasted at about 700° C. to about 900° C.

25. The process of claim 14 wherein the roasted mixture is sandmilled in water to solubilize impurities.

26. The process of claim 14 wherein the impurities are filtered from the roasted mixture.

27. The process of claim 14 wherein the acid is filtered from the solid product in step (h).

28. The process of claim 14 wherein the solid product is washed with water in step (i).

29. A process for preparing a nodular titanium dioxide pigment comprising the steps of:
    (a) comminuting a titanium dioxide-bearing material selected from the group consisting of sorelslag, beneficiated ilmenite and chloride slag to an average particle size of about 10 microns or less;
    (b) mixing the titanium dioxide-bearing material with an alkali metal compound selected from the group consisting of an alkali metal hydroxide, an alkali metal carbonate, and an alkali metal oxide;
    (c) roasting the mixture at about 700° C. to about 900° C.;
    (d) digesting the roasted material in hydrochloric acid; said digestion including heating the roasted material/acid solution to its boiling point at a rate of at about 90° C. to about 110° C. such that a nodular-shaped solid is formed; and
    (e) calcining at least the solid product at a temperature ranging from about 800° C. to about 1000° C. to form a titanium dioxide pigment.

30. A process for preparing a nodular titanium dioxide pigment comprising the steps of:

(a) sandmilling a mixture of titanium dioxide-bearing material selected from the group consisting of sorelslag, beneficiated ilmenite and chloride slag, and an alkali metal compound selected from the group consisting of an alkali metal hydroxide, an alkali metal carbonate or an alkali metal oxide in water to an average particle size of about 10 microns or less;

(b) roasting the mixture at about 700° C. to about 900° C.;

(c) sandmilling the roasted mixture in water;

(d) digesting the roasted mixture in hydrochloric acid, said digestion including heating the roasted material/acid solution to its boiling point at a rate sufficient to form nodular solids of titanium dioxide material; and (e) calcining the titanium dioxide material at a temperature ranging from about 800° C. to about 1000° C. to form a titanium dioxide pigment.

31. The process of claim 29 wherein the digesting is carried out in about 10 to about 120 minutes.

32. The process of claim 29 wherein the titanium dioxide pigment produced after calcination has a brightness ($R\infty$) of about 80 percent or above.

33. The process of claim 29 wherein the titanium dioxide pigment produced after calcination has a scattering coefficient (S) of about 2000 $cm^2/g$ or above.

34. The process of claim 29 wherein the titanium dioxide pigment produced after calcination has an iron content of less than about 520 ppm.

35. The process of claim 29 wherein the titanium dioxide-bearing material is comminuted to an average particle size of about 10 microns or less.

36. The process of claim 29 wherein the titanium dioxide-bearing material is comminuted to an average particle size of about 15 microns or less.

37. The process of claim 29 wherein the titanium dioxide-bearing material is sandmilled to a maximum particle size of about 10 microns or less.

* * * * *